United States Patent
Engelbrecht et al.

(10) Patent No.: US 6,942,163 B2
(45) Date of Patent: Sep. 13, 2005

(54) IMPLEMENT WITH PLUMBING LINES THROUGH A MAIN FRAME TUBE

(75) Inventors: Joshua Jacob Engelbrecht, Ankeny, IA (US); Mark Eugene Barker, Ankeny, IA (US); Garry Eugene Baxter, Ankeny, IA (US); Jack Conan Anderson, Madrid, IA (US)

(73) Assignee: Deere & Company, Moline, IL (US)

( * ) Notice: Subject to any disclaimer, the term of this patent is extended or adjusted under 35 U.S.C. 154(b) by 169 days.

(21) Appl. No.: 10/459,314

(22) Filed: Jun. 10, 2003

(65) Prior Publication Data

US 2005/0001078 A1 Jan. 6, 2005

(51) Int. Cl.[7] ............................................. A01G 25/09
(52) U.S. Cl. ...................... 239/172; 239/146; 239/302; 239/304
(58) Field of Search ................................ 239/146, 159, 239/172, 173, 302, 304; 280/830, 834, 838

(56) References Cited

U.S. PATENT DOCUMENTS

| | | | |
|---|---|---|---|
| 1,422,107 A | | 7/1922 | Kramer |
| 3,857,576 A | * | 12/1974 | Wilt ............................ 239/172 |
| 5,135,258 A | | 8/1992 | Buxton |
| 5,368,332 A | * | 11/1994 | Dittrich et al. ............. 239/146 |
| 5,593,070 A | | 1/1997 | Steadman |
| 5,782,493 A | | 7/1998 | Bolton et al. |
| 6,182,588 B1 | * | 2/2001 | Bodie et al. ................ 111/174 |

FOREIGN PATENT DOCUMENTS

| | | |
|---|---|---|
| EP | 0 968 878 A2 | 1/2000 |
| EP | 0 968 878 A3 | 2/2000 |
| GB | 258394 | 9/1926 |

* cited by examiner

*Primary Examiner*—Steven J. Ganey

(57) ABSTRACT

An agricultural sprayer includes tubular main frame rails supporting tank and plumbing structure. A tank port is located between the rails with a substantial portion of the plumbing structure supported between the rails and between the upper and lower planes of the rails for protection and a neat appearance. The upright walls of the rails include round holes reinforced with round tube secured to the walls to seal the wall and prevent contaminants from entering the rails. The round tube is split to allow torsional frame flexibility while preventing high stress at the round tube sidewall connections. A straight horizontal fluid line path between the port and a location outside the frame is provided through the round tube to limit line length, eliminate elbows, improve appearance, improve cleanout functions and facilitate a low mounting of the tank on the frame.

23 Claims, 2 Drawing Sheets

US 6,942,163 B2

IMPLEMENT WITH PLUMBING LINES THROUGH A MAIN FRAME TUBE

FIELD OF THE INVENTION

The present invention relates generally to self-propelled agricultural implement frames and more specifically to frames for implements with fluid lines routed from tanks or reservoirs supported by the frame.

BACKGROUND OF THE INVENTION

Agricultural implements such as self-propelled field sprayers include a main frame supported by wheel assemblies for forward movement over the ground. The main frame typically includes large fore-and-aft extending main frame beams or rails which support the implement cab, power train, various fluid tanks including large chemical solution tanks, and plumbing. Tank outlets and other plumbing components located between the rails often lack accessibility. Therefore, plumbing lines have to be routed either over or under the main frame beams to locations outside the implement frame for better accessibility by an operator. Such routing can require elbows and additional hose lengths which result in an unsightly and cluttered implement appearance. Lines are harder to clean because of the added length and non-linear routing. The exposed lines are also subject to damage from tall crops, weeds, brush, debris and other passing objects. Some tanks are raised to accommodate the necessary line routing around the frame, but this increases transport height and raises the center of gravity of the machine.

SUMMARY OF THE INVENTION

It is therefore an object of the invention to provide an improved frame arrangement for an implement. It is a further object to provide such a frame arrangement which overcomes one or more of the above-mentioned problems.

It is yet another object of the invention to provide an improved frame arrangement for an implement facilitating routing of plumbing lines on the implement. It is yet another object to provide such an arrangement which eliminates need to route fluid lines over or under main frame members. It is still another object to provide such an arrangement which facilitates cleaning of fluid lines, increases protection of system plumbing, and helps lower the center of gravity of the implement.

It is a further object of the invention to provide an improved frame arrangement for an implement which improves appearance, reduces fluid line lengths and improves plumbing accessibility.

It is a further object to provide a frame arrangement having openings for better routing of fluid lines. It is another object to provide such a frame arrangement which improves frame strength without sacrificing flexibility and without subjecting the insides of main tubular beam frame members to contamination.

An agricultural implement such as a self-propelled field sprayer includes tubular main frame rails which support tank and plumbing structure. A tank port is located between the rails with a substantial portion of the plumbing structure supported between the rails and between the upper and lower planes of the rails for protection and a neat appearance. The upright walls of the rails include round holes reinforced with round tubes. The tubes are secured to the walls to seal the area around the holes and prevent contaminants from entering the rails. The round tube is split to allow torsional frame flexibility while preventing high stress at the round tube connections to the walls. A horizontal fluid line path between the port and a location outside the frame is provided through the round tube to limit line length, eliminate elbows, improve appearance, improve line cleanout functions and facilitate a low mounting of the tank on the frame. Additional reinforced openings through ends of the rails receive hydraulic lines and cylinders for various wheel assembly functions. The lines and cylinders are protected by the rails, a substantial portion of which are located between planes defined by the tops and bottoms of the rails.

These and other objects, features and advantages of the present invention will become apparent from the detailed description below in view of the drawings.

DESCRIPTION OF THE PREFERRED EMBODIMENT

Figure 1:
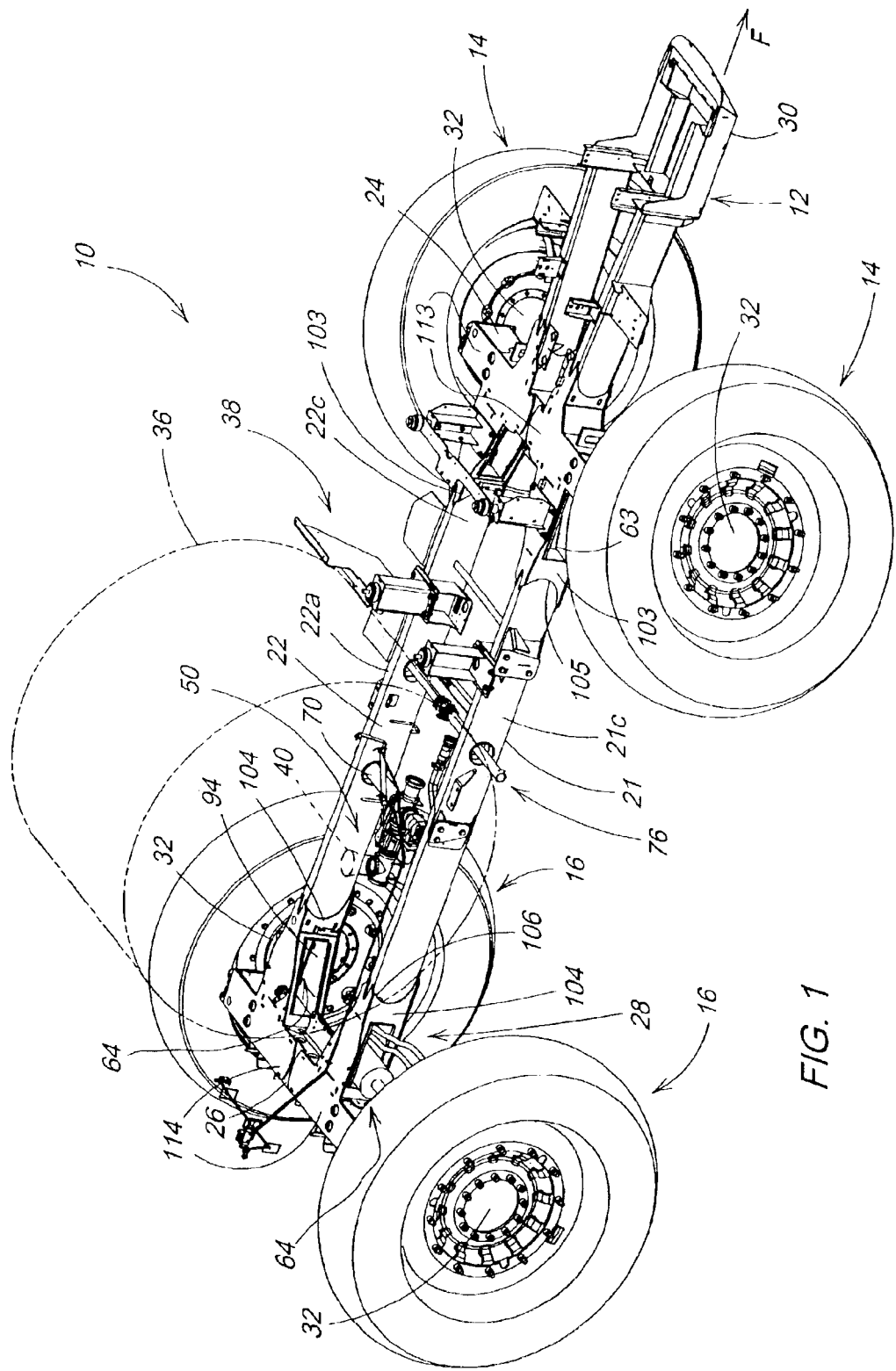
FIG. 1 is a perspective view of a portion of an agricultural sprayer.

Referring to FIG. 1, therein is shown a portion of an agricultural implement such as a self-propelled field sprayer 10 having a main frame 12 supported for forward movement (F) over the ground by front steerable ground wheel assemblies 14 and rear wheel assemblies 16. The main frame 12 includes first and second main fore-and-aft extending tubular beams or rails 21 and 22 connected to a forward axle support frame 24 and aft axle support frame 26 for the forward wheel assemblies 14 and rear wheel assemblies 16. Hydraulically actuated structure indicated generally at 28, such as wheel tread adjustment structure or other wheel axle related operating structure, provides a powered wheel adjustment function. An engine support frame 30 projects forwardly from the axle support frame 24. The engine powers hydraulic drive structure 32 connected to the wheels to propel the frame implement 10.

Various tank structures including a large fluid tank 36 are carried by tank supports indicated generally at 38. The tank 36 includes a lower outlet or port 40 located between the rails 21 and 22 and between the support frames 24 and 26. Plumbing structure 50 is connected to the port 40 between the rails 21 and 22 in fluid communication with the tank 36.

Figure 2:
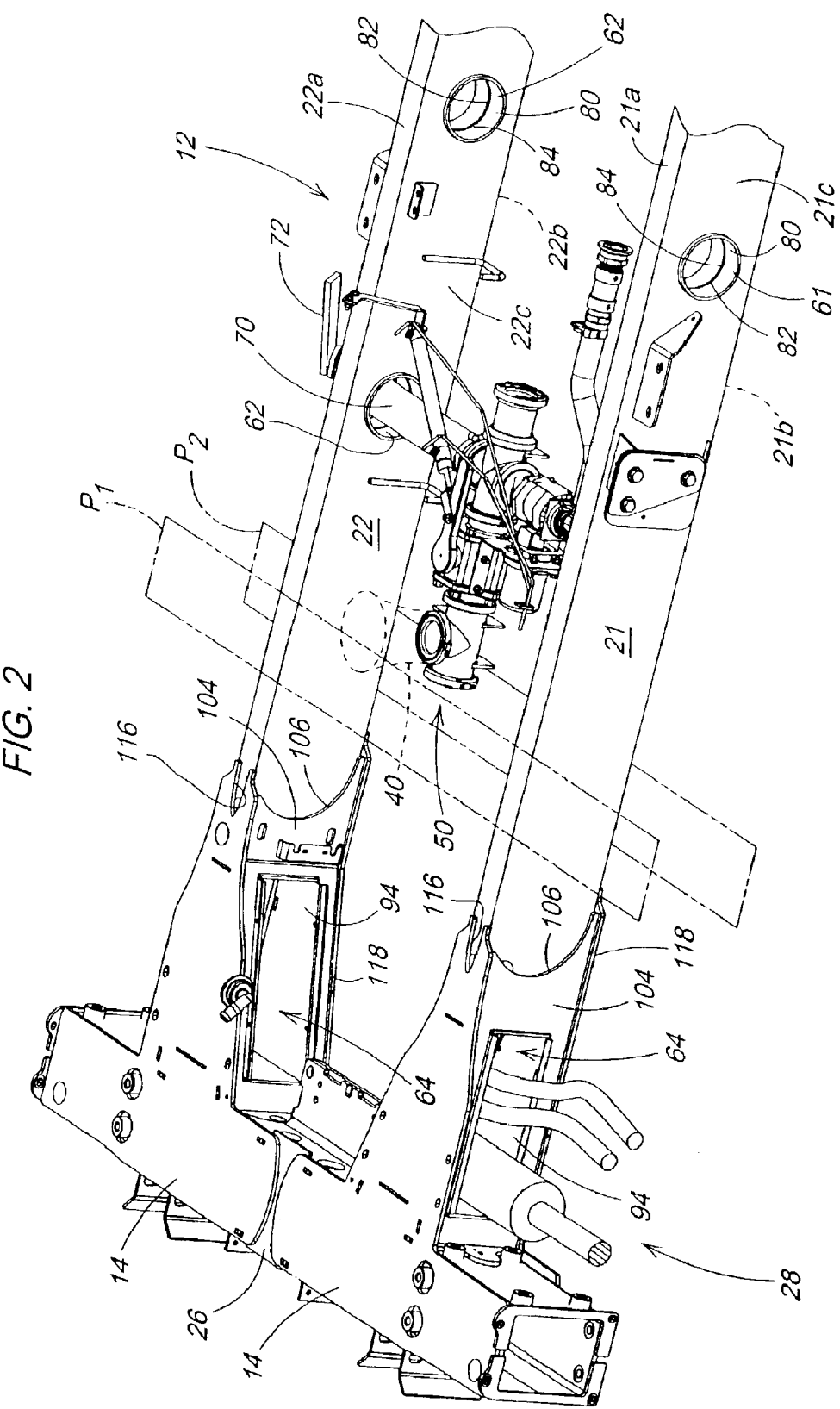
FIG. 2 is an enlarged perspective view of a portion of the main frame of the sprayer of FIG. 1.

The rails 21 and 22 have top walls 21a and 22a and bottom walls 21b and 22b connected by opposite side walls 21c and 22c to define generally rectangular beam cross sections. The top and bottom walls define parallel, horizontally disposed upper and lower planes in the area of the plumbing structure 50 (see P1 and P2 in FIG. 2). The port 40 and the plumbing structure 50 lie substantially between the rails 21 and 22 between the planes P1 and P2.

The central portions of the rails 21 and 22 include openings 61 and 62 to facilitate placement of lines from an area between the inner side walls 22c to areas outside of the main frame 12 while maintaining the lines generally between the planes P1 and P2 for protection, better appearance and straighter path with minimal vertical variations. Reinforced front and rear openings 63 and 64 accommodate the structures 28 and hydraulic lines for the structures. A supply line 70 extending through one of the openings 62 provides a level path for fluid between the port 40 and an operator control valve 72 located outside of the rails 21 and 22. The port 40, the plumbing structure 50 including actuators and valves and supply lines, as well as the hydraulic wheel actuating structures 28, are substantially contained between the planes P1 and P2. Various types of controls and lines 76 including electric and hydraulic lines can be routed between locations inside and outside the rails 21 and 22 through the openings 61 and 62 rather than over or under the rails.

The openings 61 and 62 include tubular members or open cylindrical sections 80 welded to the opposite side walls 21c and 22c of each of the rails 21 and 22, respectively. The sections are split at central locations 82 to allow torsional frame flexibility while preventing high stress at the round tube sidewall connections. A grommet or flexible seal 84 may be inserted at the split location 82, but it has been found that by simply maintaining the sections in close proximity to each other sufficient sealing is provided. The inside of the tubular rail is generally closed to prevent debris and contaminants from entering the inside of the rail. Conventional paint drain holes (not shown) allow any contaminants to exit the interior of the rail.

The openings 63 and 64, shown as being generally rectangular, are reinforced with plate structure 94 welded to the rails 21 and 22 to strengthen the frame and seal the inside of the rails against debris and contamination adjacent the openings. Side reinforcing plates 103 and 104 with apertures conforming to the openings 63 and 64 are welded to the sides 21c and 22c around the openings. The plates include inwardly directed rounded cut-outs 105 and 106 for better distribution of side loading adjacent the openings 63 and 64. Upper reinforcing plate structure 113 and 114 is connected over the openings 63 and 64 and over the corresponding axle frames 24 and 26. Load distribution cut-outs 116 are located at the innermost ends of the plates adjacent the inner extremities of the openings. Similar plate structure 118 is connected below the openings and below the axle frames.

Having described the preferred embodiment, it will become apparent that various modifications can be made without departing from the scope of the invention as defined in the accompanying claims.

We claim:

1. An agricultural implement with a frame adapted for movement over the ground and including first and second transversely spaced main frame members extending in a fore-and-aft direction, a supply tank supported on the frame members and having a port located between the main frame members, a supply line extending generally horizontally from the port through the first main frame members to a location outwardly of the frame; and wherein the main frame members includes an apertured area receiving the supply line therethrough, and a reinforcement member secured to the apertured area for strengthening the first frame member in the apertured area.

2. The implement as set forth in claim 1 wherein the first frame member comprises a tubular beam having opposed sidewalls and the reinforcement member comprises a transversely extending tubular member fixed to the sidewalls.

3. The implement as set forth in claim 2 wherein the tubular member includes a split portion to provide torsional flexibility of the tubular beam and limiting stress in the sidewalls at the apertured area.

4. The implement as set forth in claim 3 wherein the split portion includes closely adjacent edges preventing contaminants from entering the tubular member.

5. An agricultural implement with a frame adapted for movement over the ground and including first and second transversely spaced main frame members extending in a fore-and-aft direction, a supply tank supported on the frame members and having a port located between the main frame members, a supply line extending generally horizontally from the port through the first main frame members to a location outwardly of the frame; and wherein the main frame members include lower surfaces defining a lower main frame plane, and wherein the supply line is located above the lower main frame plane between the frame members.

6. The implement as set forth in claim 5 wherein the main frame members include upper surfaces defining an upper main frame plane, and wherein the supply line is located between the planes.

7. An agricultural implement with a frame adapted for movement over the around and including first and second transversely spaced main frame members extending in a fore-and-aft direction, a supply tank supported on the frame members and having a port located between the main frame members, and a supply line extending generally horizontally from the port through the first main frame members to a location outwardly of the frame; and further comprising an axle assembly connected to the frame, wherein the main frame members include openings adapted for receiving axle hydraulic components therethrough.

8. The implement as set forth in claim 7 wherein the main frame members include reinforcing plates offset vertically from the openings and strengthening the main frame members adjacent the openings.

9. The implement as set forth in claim 7 including side plates connected to the main frame members adjacent the openings, the side plates including fore-and-aft extremities having a cut-out section with a rounded configuration for distributing stress loading in the main frame members adjacent the opening.

10. An agricultural spraying implement with a frame adapted for movement over the ground and including first and second transversely spaced main frame members having upper and lower surfaces extending in a fore-and-aft direction, a supply tank supported on the frame members having a port located between the surfaces, and supply line structure extending generally horizontally from the port through at least one of the frame members to a location outwardly of the frame; and wherein the main frame members includes an apertured area receiving the supply line structure, and a reinforcement member secured to the apertured area for strengthening the frame members in the apertured area.

11. The implement as set forth in claim 10 wherein the frame members include a tubular beam having opposed sidewalls, and the reinforcement member comprises a transversely extending tubular member fixed to the sidewalls.

12. The implement as set forth in claim 11 wherein the tubular member includes a split portion to provide torsional flexibility of the tubular beam while limiting stress in the sidewalls at the apertured area.

13. The implement as set forth in claim 12 wherein the split portion includes edge structure generally closing the tubular member and preventing contaminants from entering the tubular member.

14. The implement as set forth in claim 10 wherein the main frame members include lower surfaces defining a lower main frame plane, and wherein the supply line is located above the lower main frame plane between the frame members.

15. An agricultural spraying implement with a frame adapted for movement over the ground and including first and second transversely spaced main frame members having upper and lower surfaces extending in a fore-and-aft direction, a supply tank supported on the frame members having a port located between the surfaces, and supply line structure extending generally horizontally from the port through at least one of the frame members to a location outwardly of the frame;

wherein the main frame members include lower surfaces defining a lower main frame plane, and wherein the supply line is located above the lower main frame plane between the frame members; and wherein the main frame members include upper surfaces defining an upper main frame plane, and wherein the supply line is located between the planes.

16. An agricultural spraying implement with a frame adapted for movement over the ground and including first and second transversely spaced main frame members having upper and lower surfaces extending in a fore-and-aft direction, a supply tank supported on the frame members having a port located between the surfaces, and supply line structure extending generally horizontally from the port through at least one of the frame members to a location outwardly of the frame; and further comprising an axle assembly with axle components connected to the frame, wherein the main frame members include a tubular beam having openings adapted for receiving axle components therethrough.

17. The implement as set forth in claim 16 including side plates connected to the main frame members adjacent the openings, the side plates including fore-and-aft extremities having a cut-out section with a rounded configuration for distributing stress loading in the main frame members adjacent the openings.

18. The implement as set forth in claim 16 wherein the axle components comprise tread adjust cylinder structure extending horizontally through the tubular beams, the tubular beams protectively shielding a portion of the cylinder structure from plant material passing under the main frame members.

19. An agricultural implement with a frame adapted for movement over the ground and including first and second transversely spaced main frame members extending in a fore-and-aft direction, a movable axle assembly connected to the main frame members including hydraulic structure for moving the axle assembly, wherein the main frame members include a reinforced apertured portion receiving a portion of the hydraulic structure therethrough and protecting the hydraulic structure from damage by plant material passing under the main frame members; and wherein the main frame members include a tubular member having sidewalls connected by top and bottom walls and the apertured portion comprises opening in the sidewalls and plates connected to the tubular member to reinforce the apertured portion and close the tubular member to entry of contaminants from outside the tubular member.

20. An agricultural implement with a frame adapted for movement over the ground and including first and second transversel, spaced main frame members extending in a fore-and-aft direction, a movable axle assembly connected to the main frame members including hydraulic structure for moving the axle assembly, and wherein the main frame members include a reinforced apertured portion receiving a portion of the hydraulic structure therethrough and protecting the hydraulic structure from damage by plant material passing under the main frame members; and wherein the main frame members include a tubular beam having horizontal and vertical pairs of walls, a tubular member fixed to and extending between a pair of the walls, the tubular member defining a fluid line opening through the tubular beam, and a fluid supply line connected to the outlet and extending through the fluid line opening.

21. The implement as set forth in claim 20 wherein the tubular member includes a split portion providing torsional flexibility to the tubular beam and limiting stress in the walls at the fluid line opening.

22. The implement as set forth in claim 20 wherein the tubular member comprises a horizontally extending tube connected to the vertical walls, and wherein the fluid line extends horizontally through the tube.

23. The implement as set forth in claim 19 further comprising an axle frame connected to the main frame members and plate structure connected to the axle frame and to the main frame members, the plate structure located adjacent the apertured portion.

* * * * *